United States Patent Office 3,396,081
Patented Aug. 6, 1968

3,396,081
HYALURONIC ACID PREPARATION AND
METHOD OF PRODUCING SAME
Gerhard Billek, Hamburg-Schenefeld, Germany, assignor to Etapharm chem. pharm. Laboratorium Gesellschaft m.b.H., Vienna, Austria
No Drawing. Filed Mar. 16, 1966, Ser. No. 534,632
Claims priority, application Austria, Mar. 17, 1965, A 2,404/65
5 Claims. (Cl. 195—7)

ABSTRACT OF THE DISCLOSURE

Hyaluronic acid preparation composed of a solution of hyaluronic acid free from proteins, antigens and pyrogens and method of producing this preparation.

---

This invention relates to hyaluronic acid preparations and more particularly to pure, highly viscous and heat-sterilisable hyaluronic acid preparations, which are free from proteins, antigens, and pyrogens, and to a process of producing such preparations.

Various methods are known for producing hyaluronic acid, and some have been described in patent specifications. Since this compound cannot be produced by synthesis, the only methods available are those for isolating it from a natural product. In addition to the vitreous body of human and animal eyes, use has also been made of other organs which have a relatively high content of hyaluronic acid, for example the umbilical cord, pigskin, synovial fluid, cocks' combs, the walls of veins and arteries. Hyaluronic acid is formed in sarcomas and is deposited in the culture medium by various bacteria (J. S. Brimacombe and J. M. Webber, "Mucopolysaccharides," Elsevier Publishing Company, Amsterdam, 1964).

In no case does hyaluronic acid occur in the pure form, but only firmly bound to proteins. In addition to the umbilical cord, the vitreous bodies of animal eyes, which are more easily available, have the highest content of hyaluronic acid, but here again the separation of the protein component is the most important step of the isolation process. In principle the known methods of producing hyaluronic acid consist of proteolytic decomposition of the albumen component, removal of the resulting amino acids by dialysis or exchangers, followed by repeated reprecipitation of the hyaluronic acid for the purpose of further purification. All these methods have the disadvantage in common that the proteolytic decomposition of the albumen is not complete and there is always a small amount of residual albumen, which must then be separately removed by more or less complicated reactions. These additional treatments always lead to extensive decomposition of hyaluronic acid, the solutions of which necessarily show an increasing fall in viscosity as purity increases or, if such additional treatments are broken off prematurely, products are obtained which still have a considerable protein content. Ordinary commercial hyaluronic acid preparations contain up to 5% of protein and therefore cannot be used for many purposes (H. U. Bergmeyer, "Methoden der enzymatischen Analyse," Verlag Chemie, Weinheim, 1962, p. 1023).

In U.S. patent specification No. 2,585,546 of Feb. 12, 1952, the production of a highly viscous hyaluronic acid is described, the starting material being human and animal umbilical cords. By this method, which entails a great deal of work, hyaluronic acid solutions are obtained which at a concentration of 1 mg./ml. have a relative viscosity of 8.2. The purity of the preparation obtained in this manner is to be doubted, since the authors indicate nitrogen contents of 2.8–4.3%.

In a later application of the same authors, proteolytic ferments are used for decomposing the proteins, as described in U.S. patent specification No. 2,583,096 of Jan. 1, 1952. According to the analysis data given, pure, uniform preparations are also not obtained by this method. It is known that enzymatic decomposition of the natural hyaluronic acid-protein complex does not supply hyaluronic acid completely free from protein (H. Gibian, "Mucopolysaccharide und Mucopolysaccharidasen," F. Deuticke, Vienna, 1959).

In the British patent specification No. 818,336 of June 21, 1957, the isolation of a new acid aminopolysaccharide from the mucous membrane of a pig is described, this product probably being hyaluronic acid. In this case it would appear that a pure preparation free from protein has been obtained, this result being achieved through the application of a 19-stage process, during which degradation of the hyaluronic acid would appear to have occurred, because a relative viscosity of the solution (0.5% in 0.9% sodium chloride at 37° C.) amounted to only 1.87.

The production of a hyaluronic acid preparation from the vitreous bodies of animal eyes is also described in Russian patent specification No. 130,159 of Nov. 2, 1960. In this case ballast substances are removed by homogenisation, filtration, and treatment with chloroform followed by precipitation with ethanol. This method obviously does not supply preparations free from protein, which moreover does not appear to be necessary for the purpose indicated, namely for the external treatment of slow healing wounds and tumours with slight granulation.

In chemical literature some methods are described the object of which was to isolate a native hyaluronic acid with the least possible modification, mainly for the purpose of structure investigations and despite the extravagant nature of the methods used. Thus T. C. Laurent (J. Biol. Chem. 216, 263 (1955)), obtained a hyaluronic acid stated to be largely unchanged, from the vitreous body of animal eyes by ultracentrifuging and without previous enzymatic decomposition. The final product however contains up to 5% of protein.

According to T. C. Laurent, M. Ryan, and A. Pietruskiewicz (Biochim. Bipohys. Acta 42, 476 (1960)), hyaluronic acid can be precipitated and centrifuged as cetyl pyridinium salt. After further purification operations, which included repeated dialysis, the final products still contained over 1% of protein.

D. Hamerman and J. Sandson (Nature 188, 1194 (1960)) isolate hyaluronic acid from synovial fluid by zone electrophoresis, the final product after reprecipitation with ethanol still containing 2.5% of protein. They also state that this constitutes the hyaluronic acid obtained by mild methods which contains the lowest proportion of protein hitherto described.

Hyaluronic acid itself and also its salts form highly viscous solutions with water. It has been found that under determined conditions such solutions can be injected into the human eye as a substitute for vitreous body and in cases of retina detachment far excel in effectiveness and compatibility all vitreous body substitutes previously known (W. Widder, Graefes Arch. f. Ophthalmol. 162, 416 (1960), K. Hruby, Klin. Monatsblätter f. Augenheilkunde 138, 484 (1961)). According to W. Widder (Graefes Arch. f. Ophthalmol. 164, 550 (1962)), this applies above all to the clinically important residence time of such implants in the vitreous body. In order to comply with requirements as a vitreous body substitute fluid, the hyaluronic acid solution must have high viscosity, must be free from protein, and must contain no antigens and pyrogens. In addition it should be possible to sterilise the solution without any marked decline in viscosity.

It is one object of the present invention to provide a particular hyaluronic acid preparation which is pure, highly viscous, heat-sterilisable and free from proteins, antigens and pyrogens.

Another object of the present invention is to provide a method of producing a pure, highly viscous, heat-sterilisable hyaluronic acid preparation free from protein, antigens, and pyrogens.

A further object of the present invention is to provide a medical preparation which can be used as a substitute for the vitreous body of the human eye.

Other objects of the present invention and advantageous features thereof will become apparent as the description proceeds.

These objects, according to the present invention, can be achieved in the following manner.

From animal organs containing hyaluronic acid, such as vitreous body of the eye, umbelical cords, and so on, or from bacterial cultures producing hyaluronic acid, a dry powder is produced in the usual manner, for example by precipitation with acetone. In order to facilitate enzymatic decomposition, the suspension of this dry powder is heated in water for a short time in the alkaline range whereby the protein component is denatured. After adjustment of the optimum pH and temperature range for the enzyme used, the protein is decomposed by proteolytic ferments, preferably by a hydrolase mixture of *Aspergillus oryzae*. After removing the free amino acids and mineral salts by treatment with ion exchangers, an impure hyaluronic acid solution still containing protein is obtained. The essential, new step of the method according to the invention now consists in that the solution thus obtained of the impure hyaluronic acid containing residual protein is adjusted to an acid pH range of about 3–4 in which the impurities form with the hyaluronic acid an insoluble complex, while part of the hyaluronic acid itself functions as precipitant for the impurities, particularly for the residual proteins which can otherwise be removed only with difficulty without depolymerisation of the hyaluronic acid, whereupon the resulting insoluble complex compounds are separated by high speed centrifuging.

After forming the sodium salt by addition of sodium carbonate or sodium bicarbonate, the resulting hyaluronic acid solution with a concentration of 0.2% in water has a relative specific viscosity of 20 and constitutes a water-clear solution free from proteins, antigens, and pyrogens. In consequence of the exceptional purity of the hyaluronic acid, this solution can be sterilised by heat, the fall in viscosity not being considerable. This contrasts with the existing teaching that neutral hyaluronic acid solutions, that is to say the salts of this compound, will not tolerate high temperatures (even 60° C.) and therefore cannot be sterilised by heat (R. W. Jeanloz and E. Forchielli, J. Biol. Chem. 186, 495 (1950)).

The hyaluronic acid solutions produced by this method can be freeze dried and after being redissolved in the corresponding amount of water yield a preparation having the original properties.

The highly pure hyaluronic acid solution produced according to the invention is a medicine and can be used as a substitute for the vitreous body of the human eye in cases of injuries of the eye or detachment of the retina (ablatio retinae).

I claim:

1. A method of producing a pure, highly viscous, heat-sterilisable hyaluronic acid preparation free from proteins, antigens and pyrogens which comprises producing by precipitation a dry powder from animal organs containing hyaluronic acid, denaturing by heating the protein fraction of the dry powder in aqueous suspension in the alkaline range, decomposing said protein fraction by means of proteolytic ferments, and removing the free amino acids and other ionogenic substances by treatment with ion exchangers, and wherein the resulting impure hyaluronic acid is adjusted to an acid pH range of about 3–4 in which the impurities form with the hyaluronic acid an insoluble complex, while a part of the hyaluronic acid itself acts as precipitant for the impurities nd the resulting insoluble complex compounds are separated by high speed centrifuging.

2. A method as claimed in claim 1 wherein the dry powder is produced by precipitation with acetone.

3. A method as claimed in claim 1 wherein the heat-denaturated protein fraction is decomposed by a hydrolase mixture of *Aspergillus oryzae*.

4. A method as claimed in claim 1 wherein the animal organs containing hyaluronic acid comprise the vitreous body of the eye, umbilical cords or bacterial cultures producing hyaluronic acid.

5. A method according to claim 1, in which a part of the hyaluronic acid itself functions as precipitant for the impurities, particularly for the residual proteins which can otherwise be removed only with difficulty without depolymerisation of the hyaluronic acid.

References Cited

UNITED STATES PATENTS

| | | | |
|---|---|---|---|
| 2,599,172 | 6/1952 | Hadidian | 260—211 |
| 2,662,076 | 12/1953 | Hadidian et al. | 260—211 |
| 3,020,204 | 2/1962 | Ellenbogen et al. | 195—2 |

LEWIS GOTTS, *Primary Examiner.*

E. G. LOVE, *Assistant Examiner.*